(12) United States Patent
Müntener (10) Patent No.: US 6,280,076 B1
(45) Date of Patent: Aug. 28, 2001

(54) APPARATUS FOR PROCESSING DISPERSIONS OF SOLIDS IN A FATTY PHASE

(75) Inventor: Kurt Müntener, Bad Salzuflen (DE)

(73) Assignee: Richard Frisse GmbH, Bad Salzuflen (DE)

( * ) Notice: Subject to any disclaimer, the term of this patent is extended or adjusted under 35 U.S.C. 154(b) by 0 days.

(21) Appl. No.: 09/539,997

(22) Filed: Mar. 30, 2000

Related U.S. Application Data (62) Division of application No. 09/134,102, filed on Aug. 14, 1998, which is a division of application No. 08/517,453, filed on Aug. 18, 1995, now Pat. No. 5,823,673.

(30) Foreign Application Priority Data

Sep. 16, 1994 (DE) ................................................ 44 33 039

(51) Int. Cl.$^7$ ................................. B01F 7/16; B01F 15/06
(52) U.S. Cl. ........................... 366/149; 366/303; 366/305; 366/313
(58) Field of Search ........................... 366/64–67, 96–98, 366/139, 149, 194–196, 285–286, 292–296, 302, 303, 305, 307, 309, 312–314, 325.3, 326.1; 99/470

(56) References Cited

U.S. PATENT DOCUMENTS

| | | | | |
|---|---|---|---|---|
| 1,483,742 | * | 2/1924 | Nicol | 366/303 X |
| 2,159,670 | * | 5/1939 | Neitzke | 366/286 |
| 2,239,152 | * | 4/1941 | Jacobson | 366/286 |
| 2,278,051 | * | 3/1942 | Ambrose | 366/303 X |
| 2,591,966 | * | 4/1952 | Rider | 366/286 |
| 2,793,847 | * | 5/1957 | Steele | 366/295 X |
| 2,876,082 | * | 3/1959 | Morrison | 366/296 X |
| 2,939,770 | * | 6/1960 | Schwartzkopff et al. | 366/149 |
| 3,216,345 | * | 11/1965 | Rigby et al. | 366/149 |
| 3,343,922 | * | 9/1967 | Zimmer et al. | 366/149 |
| 3,458,321 | * | 7/1969 | Reinhart et al. | 366/149 |
| 3,725,013 | * | 4/1973 | Kavepa et al. | 366/149 |
| 3,730,486 | * | 5/1973 | Hayashi et al. | 366/149 |
| 4,249,877 | * | 2/1981 | Machen | 366/149 |
| 4,460,278 | * | 7/1984 | Matsubara et al. | 366/149 |
| 4,723,849 | * | 2/1988 | Boring | 366/303 X |
| 5,088,831 | * | 2/1992 | Reinhall | 366/286 |
| 5,353,696 | * | 10/1994 | Stadelmann et al. | 366/139 X |
| 5,505,537 | * | 4/1996 | Previero | 366/314 X |

FOREIGN PATENT DOCUMENTS

| | | | |
|---|---|---|---|
| 1226406 | 10/1966 | (DE) . | |
| 1227767 | 10/1966 | (DE) . | |
| 0279255 | 8/1988 | (EP) . | |
| 1368182 | * 1/1988 | (SU) | 366/292 |
| 1604446 | * 1/1988 | (SU) | 366/305 |

OTHER PUBLICATIONS

Lueger "Lexikon der Technik" (Dictionary of Technology), Rowohlt Taschenbuch Verlag, 1972, p. 704.

* cited by examiner

*Primary Examiner*—Charles E. Cooley
(74) *Attorney, Agent, or Firm*—Martin A. Farber (57) ABSTRACT

An apparatus for processing dispersions of solids in a fatty phase has at least two parts (1, 4) which can be driven with the aid of at least one drive and caused to rotate relative to one another, form a processing gap (6, g1, g2, g1', g2') between one another and are mounted relative to one another by means of at least one rotary bearing (2 or 3). One part is in the form of processing container (1) having at least one feed orifice (9) and at least one outflow orifice (11). The other part (4) is arranged essentially concentrically with the first part (1) and with the axis of rotation (A). At least one of the two parts (1 or 4) is provided with shearing tools (7, 8) on the surfaces (12, 16) facing one another. The processing container (1) is essentially conical, the cone having its smaller end face on the side of the feed orifice (9).

14 Claims, 5 Drawing Sheets

APPARATUS FOR PROCESSING DISPERSIONS OF SOLIDS IN A FATTY PHASE

RELATED APPLICATIONS

This application is a continuing (divisional) application of application Ser. No. 09/134,102 filed Aug. 14, 1998, which is a continuing (divisional) application of application Ser. No. 08/517,453 filed Aug. 18, 1995 (now U.S. Pat. No. 5,823,673 issued Oct. 20, 1998).

Co-pending application Ser. No. 09/134,102 filed Aug. 14, 1998 is hereby incorporated herein by reference in its entirety.

FIELD AND BACKGROUND OF THE INVENTION

The invention relates to an apparatus for processing dispersions of solids in a fatty phase.

Such an apparatus has been disclosed, for example, in EP-A-279255 and is used for reducing the viscosity of chocolate materials by means of shear forces between the two parts rotatable relative to one another, the outer of which usually being a stator forming a container, and the inner of which being the rotor exerting the shear forces. However, as is known in the case of other apparatuses acting with shear force, such as, for example, in the case of stirred ball mills, the function of the two parts can also be interchanged, the outer part being rotated and the inner part being stationary, or both parts can be driven and caused to rotate. Usually, both parts have shearing tools on the inner surfaces facing one another, which tools form shear gaps on the one hand between their radial end and the opposite circumferential wall and on the other hand also between one another.

SUMMARY OF THE INVENTION

If the object is to reduce the viscosity of chocolate, it is necessary to rely on the knowledge available to a person skilled in the art, according to which, in the course of liquefaction from a dry state, the chocolate is converted into a doughy, pasty state before it then finally reaches a liquid state. Depending on these different states, the energy consumption per time unit for processing such a material (and this applies in a similar manner to all materials containing solids in a fatty phase) differs very greatly, namely generally decreases.

In a first conceptual step, the invention is based on the following knowledge: if chocolate were actually to be allowed to pass through the known apparatus, the maximum power consumption would occur in the region of the feed orifice, whereas the chocolate would have become less viscous towards the outflow side and it would therefore be necessary to consume less power through shearing. This means nonuniform loading of the apparatus on the one hand and, on the other hand, that the efficiency of the apparatus decreases towards the outflow.

If the invention then examines the cause of this property of the apparatus in a further conceptual step, it is found that this phenomenon is primarily due to the cylindrical design of the two parts which are rotated relative to one another and whose uniform diameter permits only a uniform processing speed (with decreasing viscosity). This is because the shear stress τ is obtained from the relationship τ=D·eta, where D is the shear velocity (velocity of the moving surface divided by the gap width) and eta is the viscosity of the material.

In a further conceptual step, the invention is based on the consideration that it must be possible to increase the shear velocity. However, since the shear effect occurs chiefly at the shearing tools, this is achieved, according to the invention, by conical arrangement of the processing container with smaller end on the side of the feed orifice.

When the term cone is used in this context, it must be remembered that, according to Lueger "Lexikon der Technik" [Dictionary of Technology], Rowohlt Taschenbuch Verlag, 1972, page 704, a cone can be bounded not only by straight generators, as is the case with a proper cone, but also by curved generators, in which case the term improper cone is used. This is important in the present case because a relationship deviating from a straight line arises per se from the above-mentioned mathematical relationship. However, it can be very well approximated with a straight line, so that the cone may also readily be a "proper cone".

Increasing the diameter of the processing container towards the outflow results, in the shear gap between the particular shearing tool and the radially opposite circumferential wall on the one hand and axially between the intermeshing shearing tools on the other hand, in a higher velocity which leads to an increase in the shear velocity and hence to at least partial compensation of the shear stress caused by the reduction in the viscosity.

Although under these conditions the inner of the two parts may be formed in any desired manner, for example it may also be cylindrical, another formation is preferred, wherein the increase in the volume due to a conical widening of the processing container is at least partly compensated, so that the residence time of the material in the individual zones is evened out over the axial length of the apparatus.

The fact that, according to the invention, the processing container is conical and widens in the direction of flow of the dispersion also focuses attention on the arrangement of the shearing tools from new points of view. On the one hand, particularly in the case of a conical shape of the second, inner part, this will give rise to additional surfaces on which such shearing tools can be mounted; on the other hand, it is in fact intended to increase the shear effect towards the outflow.

BRIEF DESCRIPTION OF THE DRAWINGS

Further details and features of the invention, in particular for supporting the claims, are evident from the following description of embodiments shown schematically in the drawings.

DETAILED DESCRIPTION OF THE PREFERRED EMBODIMENT

Figures 1, 2, 5:
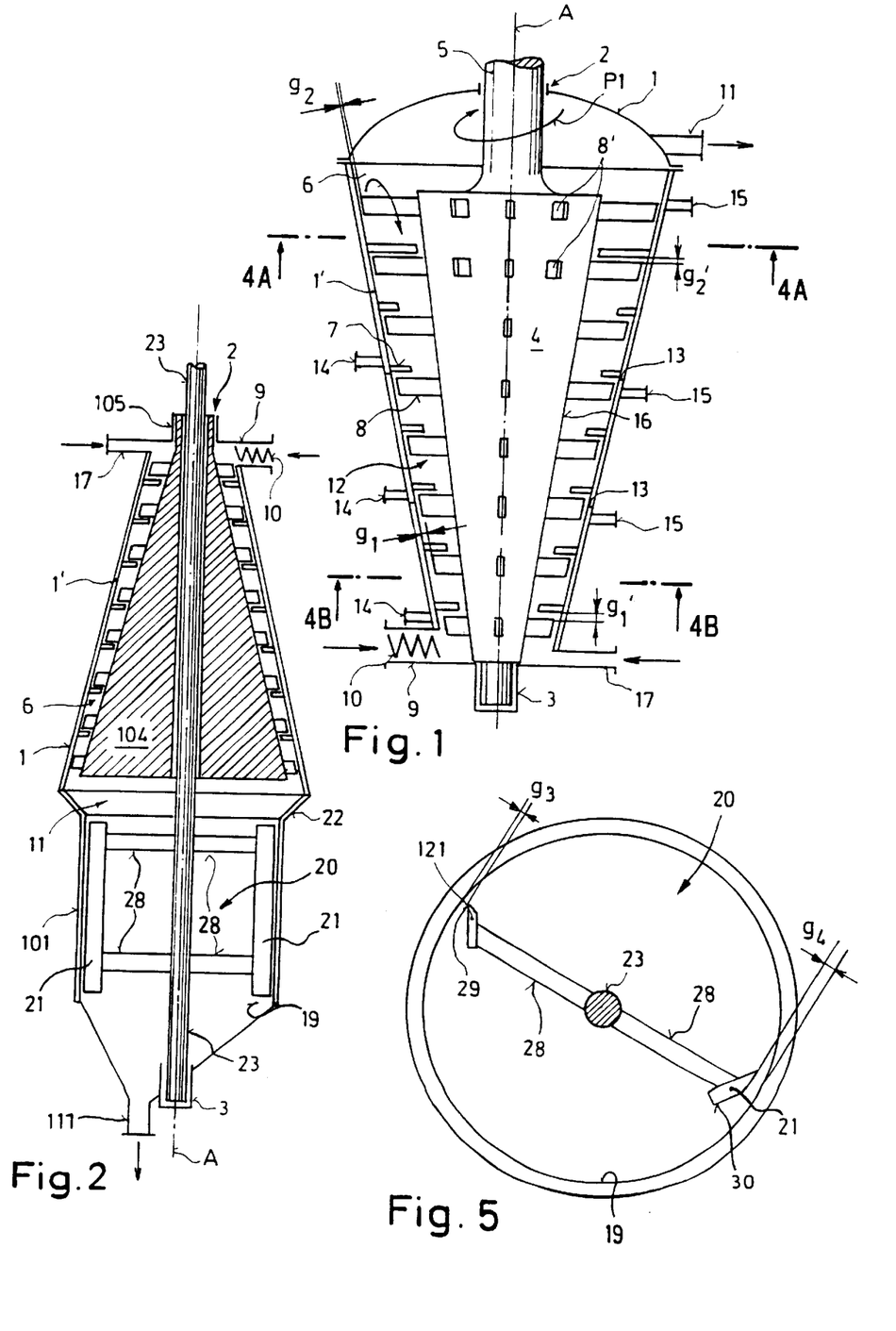
FIG. 1 shows a first embodiment according to the invention, in a simplified axial section.
FIG. 2 shows an alternative embodiment.
FIG. 5 shows a cross-section through a conche container having tools formed according to the invention.

According to FIG. 1, a processing container 1 forming a first, outer part of the apparatus and a rotor part 4 mounted therein concentrically on schematically indicated bearings 2, 3 and having a shaft 5 are provided. However, it may also be desirable to mount the rotor 4 only at one end. The rotor 4 can be driven and caused to rotate relative to the container 1 in the direction indicated by the arrow P1 by a drive means which is not shown and the shaft 5. From the following description, however, it is evident that this rotation need be only a relative rotation, i.e. at least a part of the container 1 could rotate relative to a stationary (or likewise driven) second, inner part 4, as has already been proposed for stirred ball mills.

As indicated by the double boundary lines of the container 1, the latter can be designed with an outer jacket for forming an intermediate space 1' to enable the container 1 to be heated or cooled, depending on the requirements. This intermediate space 1' may be subdivided in a manner known per se, either by being subdivided into helical thermostating channels by at least one intermediate wall drawn through in a helical manner, and thus ensuring forced transport of the coolant (generally water), or by being subdivided into several zones in succession by partitions 13 transverse to the axis, said zones being capable of being thermostated at different temperatures. For example, the feed zone is heated in order more readily to liquefy the chocolate material, whereas the region on the outflow side, at the top of FIG. 1, receives the coolant, making it possible to intensify the shearing effect there. The middle region (two or more than three thermostated regions may also be provided) may convey a carrier medium with a temperature in between. Accordingly, each region is equipped with a separate inlet pipe 14 and an outlet pipe 15.

From the above explanation, it is evident that this subdivision too is a measure for evening out the shearing effect in the direction of material flow (with decreasing viscosity of the dispersion), so that this measure is of inventive significance even independently of the conical shape of the milling container 1.

The two parts 1, 4 bound between them a processing gap 6. At least one of the two parts 1, 4, but preferably both parts, has or have shearing tools 7, 8 in this gap for processing a fat dispersion flowing through, such as chocolate. The shearing tools may have a shape which is known in the relevant technology, for example may be pin-like, knife-like or, in order to promote material flow, paddle-like with a more or less inclined position. Furthermore, the number of tools may differ over the relevant circumference of the parts. It has already been stated that the viscosity of the dispersion will decrease in the direction of flow of material through the apparatus, which in fact is also the purpose of this apparatus. Thus, the rotor 4 has, in its upper two rings of shearing tools, for example, eight such shearing tools 8' distributed over the circumference (three of which are behind the rotor 4 and are therefore not visible), whereas it has only tool rings with four shearing tools 8 each at the lower end. These numbers are of course merely examples and can be modified as desired to meet the requirements. It is also evident that increasing the shearing tools towards the outflow would be expedient independently of the conical shape of the processing container and in itself therefore also constitutes an invention, although it is evident that the conical shape also affords particularly advantageous possibilities for this purpose. Moreover, it is evident that increasing the number of shearing tools towards the outflow 11 can be realized not only on the rotor 4 but alternatively or cumulatively also on the container 1 (and is preferably realized thereon).

When the term material flow is used in this context, this takes place from an inlet connection 9, which can expediently be provided with a force transport means, such as a pump or (as indicated here) with a screw 10, to an outflow connection 11 at the top of the container 1. The screw 10 and the connection 9 forming the screw housing may be mounted and formed in a manner known per se, for example as has been disclosed for stirred ball mills in DE-B-1 226 406 or 1 227 767, so that a detailed illustration and description can be dispensed with. It is sufficient to state that as a result the dispersion to be processed is introduced under pressure into the container 1 and therefore flows through the shearing gap 6 towards the outflow 11. However, it is evident that this is only an example of a thermostating means as can also be formed in another manner known per se, for example by means of heating zones having electrical surface heating or cooling zones having a volatile, heat-absorbing coolant, provided only that the subdivision described above into at least two zones is carried out.

A further measure for intensifying the shearing effect in the direction of the material flow is to make the radial gap $g1$ or $g2$ between the radially outer edges of the shearing tools 8 of the rotor 4 and of the inner surface 12 of the container 1 narrower in the direction of the material flow, i.e. $g2<g1$. Although the same applies for the shearing tools 7 of the container 1 (the stator tools) relative to that outer surface 16 of the rotor 4 which is radially opposite them, the rotational speed will of course be greater on the radial outer side owing to the conical shape of the container 1, with the result that the main part of the shearing effect is applied there in particular when (as shown in the upper part of FIG. 1) the shearing tools 8 are relatively long. The fact that the shearing work is therefore performed predominantly radially on the outside makes it possible to make the stator tools 7 relatively short, in the manner shown in FIG. 1, although it would also be possible to tailor their length towards the outer surface 16 of the rotor 4 in such a way that a relatively narrow shearing gap is formed there too, which can then become smaller towards the outflow 11 in a manner similar to the gaps $g1$ and $g2$.

As is evident from the above explanation, the shearing effect therefore takes place predominantly on the radially outer side, and it is there in fact that the stator tools 7 interacting with the rotor tools 8 are also provided. The latter together therefore form first axial shearing gaps $g1'$ to $g2'$, and here too the processing can be intensified towards the outflow 11 by reducing the axial gap width, i.e. $g1'>g2'$. Of course, the dimensioning, according to the invention, of the gap width is also a measure which leads to the desired intensification of the shearing effect in the direction of the material flow, even without the conical shape of the container 1, and is therefore of independent inventive significance.

In the apparatus shown in FIG. 1, the conicity of the container 1 is more pronounced than that of the rotor 4, i.e. the setting angle of the surface 12 of the container 1 relative to the longitudinal axis A is greater than that of the surface 16 to the axis A. In other words, the circumferential wall 16 approaches the inner circumferential wall 12 towards the feed and thus widens the intermediate processing gap between these walls 12, 16 towards the outflow 11. As a result of this—and owing to the conicity of the container 1—the gap volume in the individual successive axial regions of the apparatus increases. This results in increasing residence times of the dispersion towards the outflow 11, i.e. the further material flowing from below mixes with the material (still) present further above. In the case of some dispersions and formulations, this mixing effect is even desirable, the mixing effect being further improved by virtue of the fact that, in the upper axial regions of the apparatus, the chocolate will become more fluid and can therefore be more readily mixed.

However, since the chief purpose of the apparatus according to the invention lies in the shearing effect, and this effect would be achieved to different extents by different residence times, it is also preferable if the gap 6 between the surfaces 12 and 16 becomes narrower towards the outflow 11. In order to completely even out the volumes in the individual axial sections, the gap 6 can be constricted in a corresponding manner so that the volume in the region of the shearing tools 8' is equal to that in a lower section in the region of two shearing rings 8. However, in order to intensify the processing, it may be desirable to reduce the gap 6 in an upward direction to an even greater extent so that the volume in the region of each ring 7, 8' is even smaller than in the region of each ring 7, 8. In any case, a constriction, based on the illustrated longitudinal section through the apparatus, of the gap 6 is preferred at least for keeping the partial volumes in the individual axial zones constant.

It should be mentioned that, although a single feed 9 is shown, several feeds—distributed over the circumference and/or distributed in the axial direction—should however be provided for the purposes of the present invention. Such a further feed may serve as an inlet for introducing a treatment material into the conical treatment container 1. Such an inlet 17 is shown at the bottom of the container 1 and can be provided for the introduction of air, sugar solution, cocoa butter or other ingredients. From the above explanation, it is however clear that several such inlets can be arranged at several points.

An embodiment having a gap 6 narrowing towards the outflow 11 is shown in FIG. 2, in which parts having the same function possess the same reference numbers as in FIG. 1, but parts having a similar function have the same reference numbers but with an additional hundreds digit.

In this embodiment, the feed 9 is at the top whereas the outflow 111 is provided at the bottom. In between is the outflow 11 of the actual liquefaction container 1, which outflow leads into a further processing container 101 underneath. In this lower container, conche treatment is carried out with the aid of shearing and/or ointment-producing tools 21 which interact with the inner surface 19 of the container 101 in a manner known per se for conche treatment. Since the shearing tools generally provided for the dry conche treatment are dispensable in the arrangement shown, comprising the liquefier 1, 104 upstream of the container 101 (the shearing work is in fact already performed in the container 1), the conche 101 can be equipped exclusively with the shearing or ointment-producing tools 21 (the difference with respect to scraping or scratching tools will be discussed below with reference to FIG. 5), which leads to a simplification of the conche treatment—and as has been found—even to a shortening of the conche treatment process. Thus, connecting a liquefier, as described above, in series with a subsequent conche treatment space 20 is particularly advantageous, regardless of the design of the container 1, so that this series connection also constitutes a separate invention.

This also applies to the possible case where the conche treatment space 20 is upstream of the liquefier, in which case, however, the mode of operation changes slightly. In this case, the chocolate would in fact either have to be pretreated or would have to enter the conche space in dry form in order to be converted into a pasty state, after which liquefaction would be effected in the container 1. The embodiment according to the subsequently discussed FIG. 5 is particularly suitable precisely for such a case, even though the embodiment discussed there is of particular interest very generally for conches.

However, since the above explanations show that the container 1 is equipped and suitable very particularly for the shearing work, it is preferable to allow it to perform the shearing work from the beginning and to arrange the conche space 20 downstream in the manner shown.

The admission of air is not unimportant with regard to the conche treatment, and it is also for this reason that at least one air inlet 17 is provided here. However, it is advisable to supply fresh air in particular to the conche space 20, which can be effected, for example, in the region of a container constriction 22. This container constriction 22 has oblique surfaces which collect the material emerging from the shearing gap 6 and distribute it uniformly over the walls of the conche container 101 underneath.

Since the apparatus is now virtually in three parts, i.e. also has the conche rotor with a shaft 23 and the ointment-producing tools 21 projecting radially therefrom, in addition to the processing container 1 or 101 and the rotor 104, it is necessary to provide separate drive means for the rotors 104 and 21, 23. This means that the shaft 105 is now in the form of a hollow shaft and is driven either by a motor which is separate from the shaft 23 or by means of a gear. The rotor 104 itself then has a passage for the shaft 23 and may itself consist of, for example, tungsten carbide or ceramic material, such as silicone carbide or silicone nitride. Such a structure is advisable in particular because of the abrasiveness of cocoa-containing materials and the resulting shear stresses.

It is evident that the container combination 1, 101 can reach a relatively considerable length. A particularly advantageous and compact apparatus is now described with reference to FIG. 3. Once again, a conical processing container 1 having tools 7 is provided, in which a rotor 204 which can be driven by means of the shaft 105 and has shearing tools 8 is mounted coaxially on bearings 2, 103. The decreasing axial shearing gap g1" or g2" in the direction of the material flow from the feed 9 to the outflow 11 with deflection over the upper edge of the rotor 204 is shown here between the outer surface 16 of the rotor 204 and the inner ends of the stator tools 7. The stated deflection preferably takes place in the manner of an overflow, i.e. the preferred orientation of the axis A is—as shown—vertical, although a horizontal or oblique arrangement would also be possible.

However, in order to achieve the deflection mentioned, the rotor 204 is in this case in the form of a hollow rotor, so that its inner wall surface 19 simultaneously forms that bounding surface of a refinement space 120 which interacts with tools of a further rotor 221 including a shaft 23 and arms 28. Thus, the volume of the rotor 204 is utilized for housing the space 120, and greater compactness is thus achieved. It is useful if the two parts driven by means of the shafts 105 and 23 have different rotational speeds so that they move relative to one another. However, different rotational speeds means not only the case of identical direction of rotation and different values of the speed but also (and in particular) rotation in opposite directions, as indicated by arrows P2 and P3 in FIG. 3. Thus, one speed has a positive sign and the other a negative one. The two speed values may, but need not, be equal (but in opposite directions).

Figure 3:
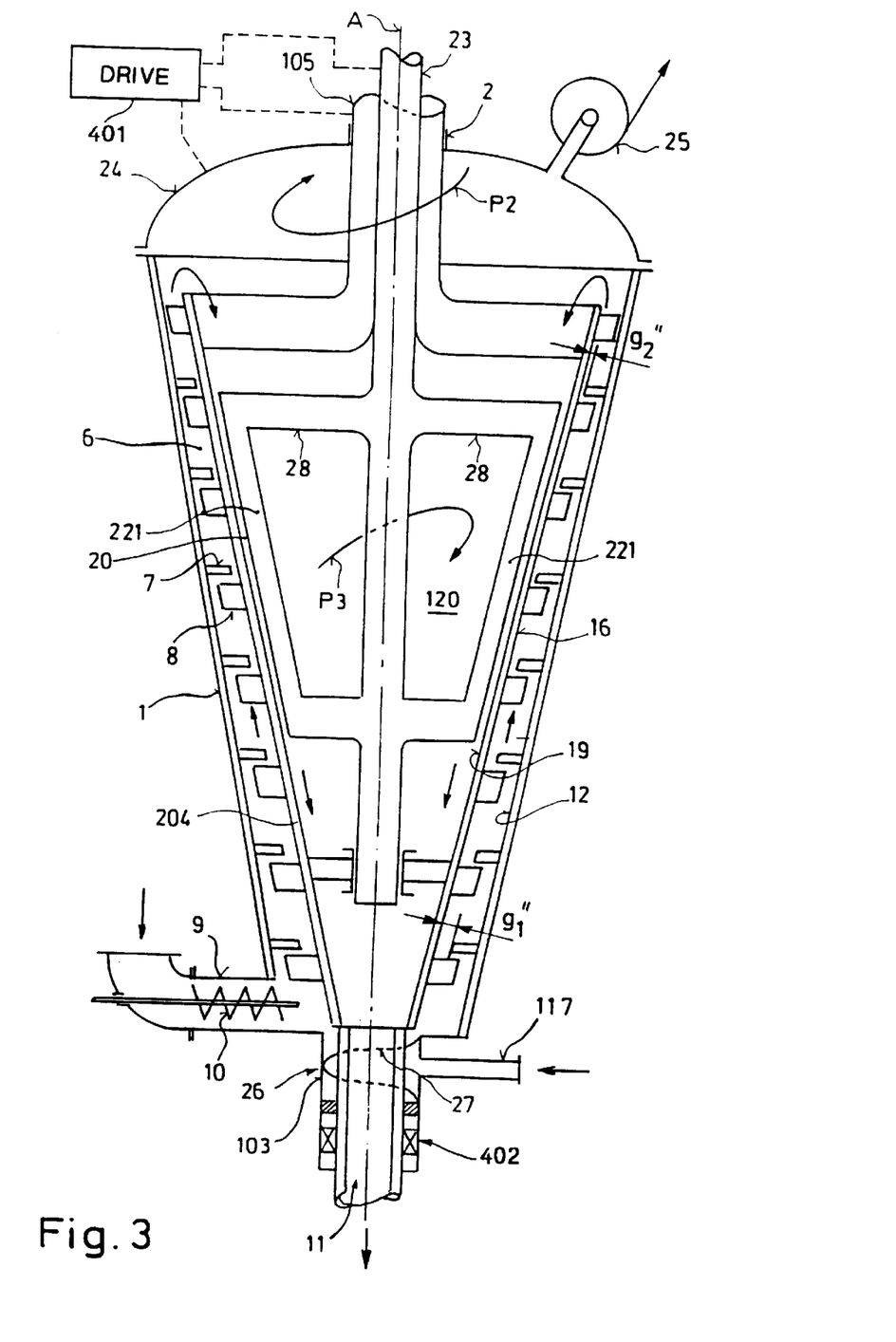
FIG. 3 shows a particularly preferred embodiment.

Although it is preferable if the tools 221 are in the form of shearing and/or ointment-producing tools of a conche, as discussed below with reference to FIG. 5, it is also possible to form the space 120 together with the associated rotor 221, 23 in the manner of a thin-film evaporator. The tools or wipers of such a thin-film evaporator can be formed according to the relevant technology.

For a thin-film evaporator, the hollow shaft 105 could be formed with a rotary inlet (not shown) for a heating medium, and a corresponding cavity for this heating medium could be provided between the surfaces 16 and 19. In this case (but also in the case of a conche), it is particularly advantageous if the space 120 is connected to an extractor for any vapours.

For this purpose, a suction fan 25 may be connected to a cover 24 for the container 1. Furthermore, it is advantageous to provide, for example, the air inlet 17 discussed with reference to FIG. 1, but an even more expedient embodiment is chosen in the present example, as described below.

One problem with such doughy pasty materials is the sealing of the bearings to prevent them from becoming soiled. As already mentioned, cocoa-containing materials are in fact relatively abrasive, the problem of hygienic operation and of prevention of bacterial attack in addition being encountered. In order therefore to prevent material to be processed from coming into contact with the bearings, and in particular with the lower bearing 103, it is preferable to provide, in the region thereof, a repulsion means 26 which generates an opposite movement against any penetrating treatment material.

Such a repulsion means 26 can alternatively have a screw 27 which is connected to the rotor 204 or rigidly fastened to said rotor and whose screw threads are formed in such a way that they convey upwards during rotation of the rotor 204, i.e. in a direction opposite to the direction of penetration of treatment material. In addition or alternatively, the stated air supply to the space 120 may be effected via an inlet 117 which blows air under pressure through the neighbouring region of the bearing 103 and thus performs a dual function by supplying the air required for refinement on the one hand and blowing out any penetrating treatment material on the other hand. Accordingly, the pipe connection is connected to a compressed air source (not shown). If both the screw 27 and the inlet 117 are provided in the manner indicated, the screw 27 does not of course constitute an obstacle to blowing in of the air; rather, the air is guided in a helical manner along the threads of the screw and also prevents soiling of said screw.

It has already been mentioned above that the inlets 17 can also be used for feeding in other additives, such as, for example, a sugar solution, milk, etc. This also applies of course to the inlet 117, since all that is relevant is in fact to feed in cleaning fluid through the bearing region, it also being possible for the cleaning fluid to be suitable as a treatment medium. It is also clear that the bearing arrangement 103 shown, having the repulsion means 26, is not only advantageous in the embodiment according to FIG. 3 but can also be used in the other embodiments.

Of course, it would in principle be possible to reverse the arrangement, i.e. to provide the shearing tools 7 and a corresponding shearing rotor on the inner surface of the hollow rotor 204 and to carry out the refinement on the outside, but the available space is better utilized with the embodiment shown.

Figure 4A:
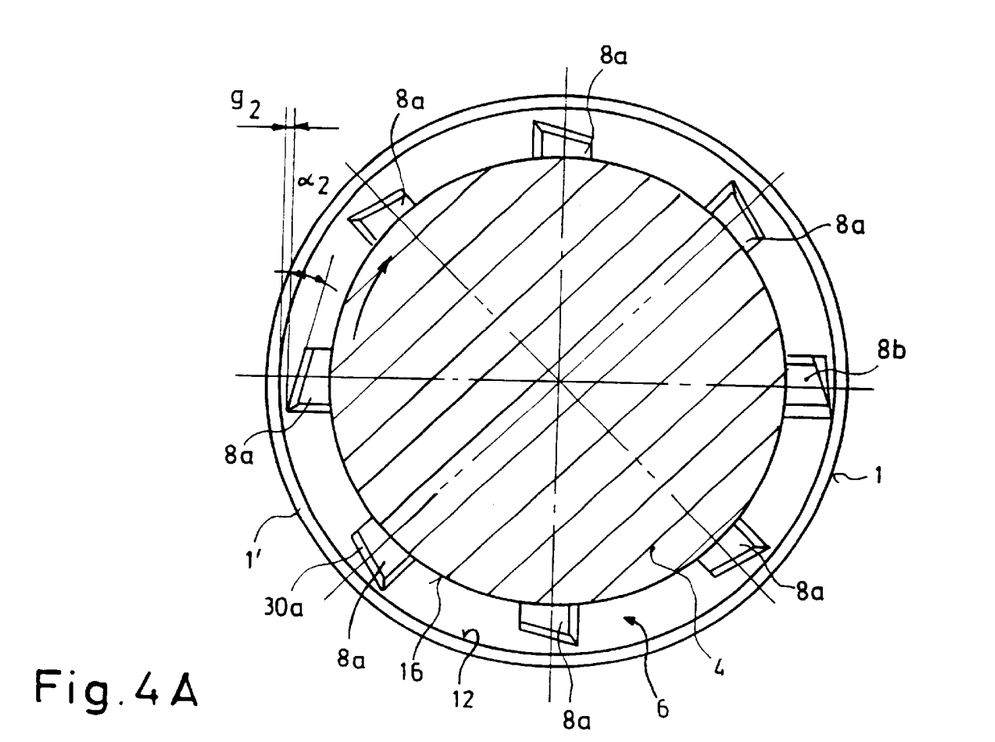
FIGS. 4A and 4B show two sections along the lines 4A—4A and 4B—4B of FIG. 1, but with a slightly varied embodiment of the rotor and its tools.
Figure 4B:
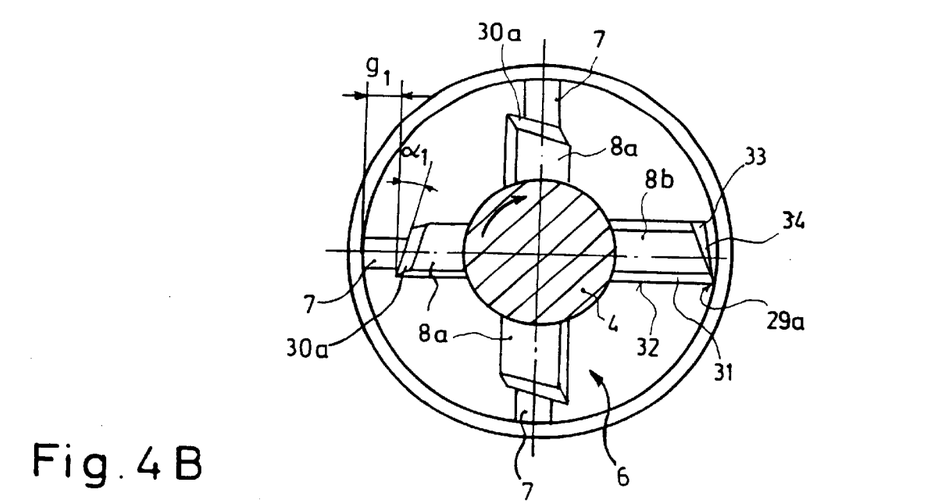

A particularly advantageous embodiment of the tools of the rotor 4 (and analogously of the rotor 104) is shown in FIGS. 4A and 4B, which represent sections along the lines 4A—4A and 4B—4B, respectively, of FIG. 1. With reference to the functions of the tools of a conche, tools 8a having a shearing and ointment-producing effect and tools 8b having a shearing and scratching effect are provided. Of these, the scratching tools according to FIG. 4B have a shearing edge 29a which leads in the direction of rotation (cf. arrow) and which is formed by two bevels, namely a lateral ground surface 31 which leads to a forward-pointing shear edge 32, preferably symmetrical from two sides with respect to a central plane of the tool 8b (the rear edge is expediently formed in the same manner), and an end bevel 33 which results in a radially outer shear edge 34. To ensure that the shear edge 29a does not make only a thin cut through the material to be treated, it is advantageous if at least the tools 8b, optionally also the shearing tools 8a, are twisted in the form of a helix.

On the other hand, the tools 8a according to FIG. 4A have a surface 30a which diverges in the direction towards the container wall 12 and, if desired, might be broadened in the manner of a shoe. This ointment-producing surface 30a thus picks up the treatment material in front of it and forces it, with shearing of the individual Theological layers, into the increasingly narrowing gap g1 (FIG. 4B) or g2 (FIG. 4A). Here too, it is evident that g1>g2. In addition, however, it may also be advantageous to increase the shearing in the upper region of the container 1, which region is on the outflow side, so that the shearing and ointment-producing surfaces 30a at the top make a smaller angle α2 with the tangent to their path of revolution than in the lower region of the rotor 4, where a larger angle α1 is present.

Of course, such a measure also leads to the desired increase in the shearing effect in the known cylindrical containers and is therefore a measure as such which is independent of the conicity of the container 1 but is particularly effective together with it. Furthermore, it is clear that the number of scratching tools 8b may also be larger, but one such tool 8b per tool ring is advantageous.

The shearing and/or ointment-producing tools used for the conche treatment were referred to again and again above, and it is therefore now intended to discuss them in more detail with reference to FIG. 5. This FIG. 5 shows a cross-section through the shaft 23, either of the embodiment according to FIG. 2 and/or of that of FIG. 3. However, the arrangement according to FIG. 5 is preferably used when, for example, a conche having the form shown in FIG. 5 is connected upstream of an apparatus according to one of the previously discussed Figures, as has already been mentioned above as a possibility.

However, FIG. 5 also illustrates two essentially identical tools 21 and 121 on arms 28 projecting radially from the shaft 23, but the two tools point in opposite directions. This means that, when the shaft 23 rotates in the clockwise direction, the tool 121 sweeps along the surface 19 of the space 20 with a relatively sharp shearing or scratching edge, this scratching edge 29 being a relatively small distance g3 from the surface 19. The treatment material thus scraped from the trough wall 19 is exposed to the air in the space 20 during rotation of the tool 121 and then falls downwards, whereas treatment material which comes into contact in the trough with an ointment-producing surface 30 facing the surface 19 is pressed against the wall 19 in the gap g4 converging towards the trough wall 19 and is converted into ointment on said wall under shearing action between the individual rheological layers. The shearing tool 121 which next passes by then removes the treatment material again from the trough wall 19 and exposes it again to the air.

It is evident that this permits very intensive conche treatment, the smallest gap g4 between the ointment-producing surface 30 converging towards the trough wall 19 (relative to the direction of rotation of the shaft 23) expediently being larger than the gap g3. The difference may be about 2:1, for example an order of magnitude of 1 to 2 mm being possible for the gap g3 and an order of magnitude of 2 to 6 mm for the gap g4.

Of course, such an arrangement of scratching (121) and ointment-producing tools 21 alternating with one another or opposite one another is very generally particularly advantageous for conche treatment and is therefore not restricted to the use of an upstream or downstream liquefier or to its conical container. Furthermore, the invention is of course not restricted to containers having a vertical axis A but is also applicable to those having a horizontal axis A. However, a vertical axis A is advisable wherever uniform distribution of the treatment material over the trough wall is important, as is expedient also in general in an embodiment according to FIG. 3.

Of course, a large number of modifications are possible within the scope of the invention; for example, it would be possible in the case of an embodiment according to FIG. 3 also to provide in the space 20 rings of shearing tools 7, 8 which are similar to those in the gap 6. However, this would mean that one of the above-mentioned measures for increasing the shearing towards the outflow 11 would have to be implemented, such as reducing the radially outer and/or the axial gap g1 or g2 and/or increasing the number of tools towards the outflow (which would be substantially more difficult owing to the decreasing conicity) and/or reducing the angle α shown in FIGS. 4. Although this possibility does in principle exist it is not preferred, owing to the possible design difficulties.

Figure 6:
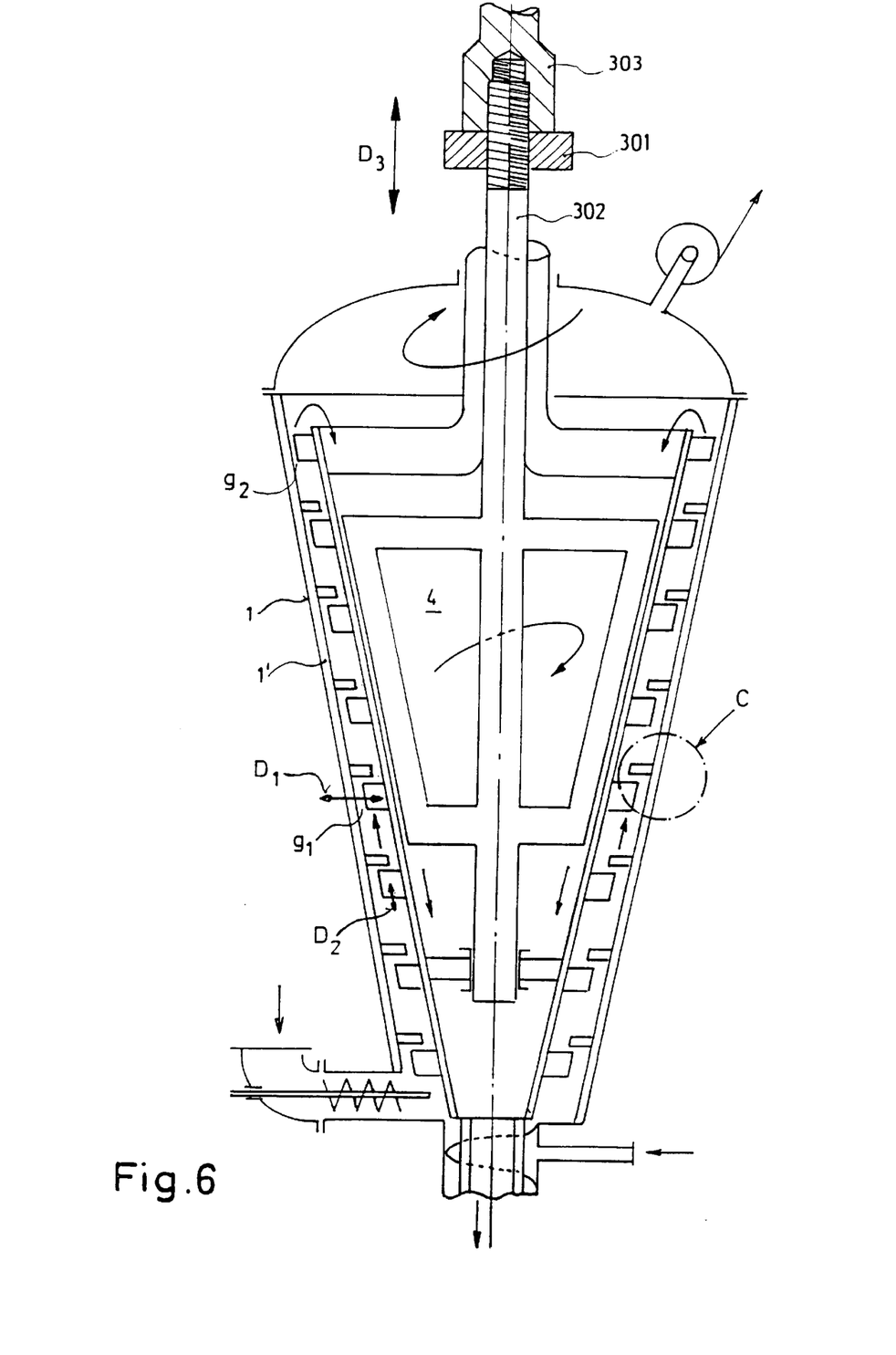
FIG. 6 shows a further embodiment of the invention.

FIG. 6 shows an apparatus for moving the rotor part 4 in direction $D_3$ of the axis of rotation. A thread 302 which is engaged by a coupling 303 provided with a suitable internal thread is provided at the driven end of the shaft. The distance g1 or g2 can be set by means of a lock nut 301, the distances being variable in the direction indicated by double arrows $D_1$ and $D_2$.

Figure 7:
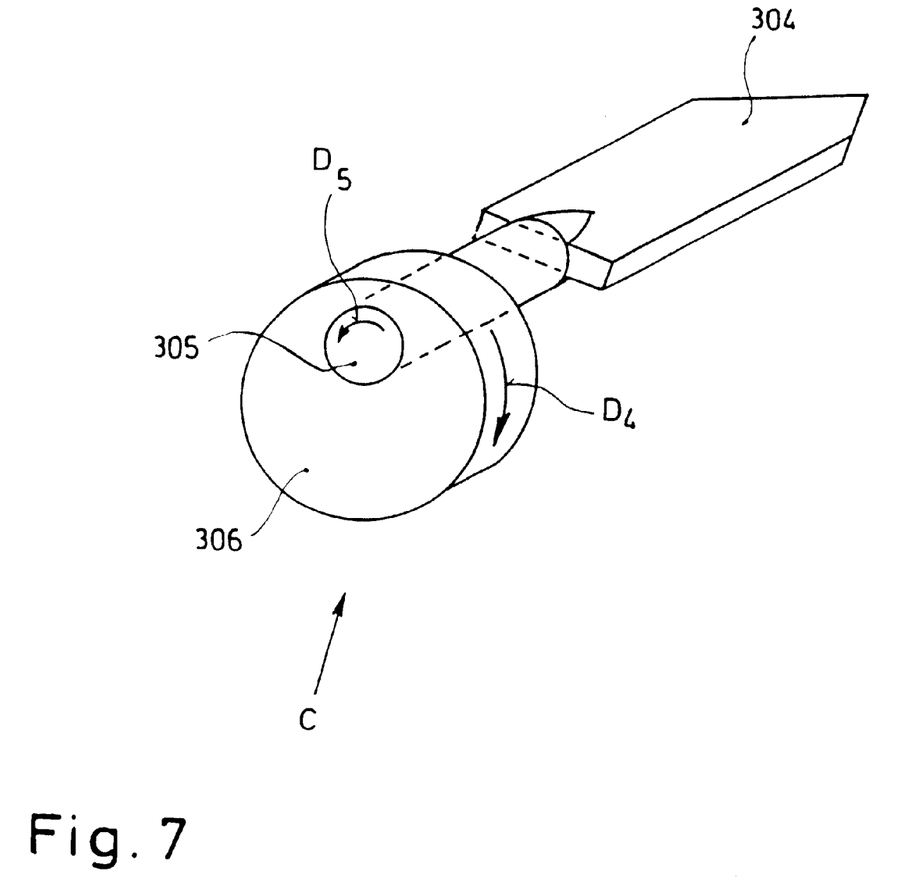
FIG. 7 shows the detail C from FIG. 6.

FIG. 7 shows the detail C of FIG. 6. The shearing tools 304 can be rotatably adjusted in order to change the distances g1' and g2' of FIG. 6. The shearing tools are rotatable on a cam 306 in the direction of rotation $D_5$ and can be fixed by means of a holder 305, the cam 306 itself being rotatable in direction of rotation $D_4$ and being capable of being fixed.

In FIG. 3, a drive 401, indicated diagrammatically, connects between the stationary container 1 and the rotatable elements, namely, the outer rotor 204 via the shaft 105 and the inner rotor 221 via the shaft 23. The drive imparts rotation to the outer rotor 204 relative to the container 1, and also imparts rotation to the inner rotor 221 relative to the container 1. Each of the rotors 204 and 221 may be driven by means within the drive 401 at a desired speed and direction relative to each other and relative to the container 1 by the drive 401. By way of example, the drive 401 may comprise two separate motors (not shown) connected to respective ones of the rotors 204 and 221 under suitable speed controls.

FIGS. 4A and 4B show configurations and arrangements of the tools extending into the space between the container 1 and the rotor 4 of FIG. 1. The same configuration of tools may be employed for the tools (FIG. 3) extending into the space between the container 1 and the inner rotor 221. In both the apparatus of FIGS. 1 and 3, the tools may be inclined with respect to a direction of rotation so as to form a portion of a helix. It is noted that the embodiment of the invention shown in FIG. 3 operates in accordance with the same theory of operation as the embodiment of FIG. 1, but provides for a more compact configuration by folding the material processing passage (the gap 6 of FIG. 1), thereby reducing the axial length of the processing region by a factor of two. The bearings 2 and 3 of FIG. 1 are replaced in FIG. 3 with a composite bearing assembly 402 (partly shown in FIG. 3) for journaling the inner rotor 221 within the outer rotor 204 which, in turn, is journaled within the container 1. Therefore, the same tools may be used in both embodiments of the invention.

What is claimed is:

1. An apparatus for processing dispersions of solids in a fatty phase, comprising:

at least one drive means for imparting rotational movement;

first processing means being formed as a processing container including at least one supply opening and at least one discharge opening, the processing container being of conical shape having an outer conical surface, an inner conical surface, and a smaller front plane of its conical shape located on a side of said supply opening, said supply opening and said discharge opening being located distant from each other on said first processing means;

second processing means substantially concentric to said first processing means and having an outer surface facing the inner conical surface of the processing container of the first processing means;

at least one of said first and second processing means being connected to a respective one of said at least one drive means, at least one of said first and second processing means including shearing tool means which protrude radially toward the other of said processing means, said first and said second processing means being supported in a rotatable manner relative to each other about an axis of rotation, a processing gap being formed therebetween; and journal means for enabling rotation of one of said first and said second processing means relative to the other of said first and said second processing means;

wherein the shearing tool means of one of said first and said second processing means, relative to the direction of rotation, have ointment-producing surfaces (30a) which diverge relative to a facing surface of the other of said first and said second processing means in a forward direction of movement of said one of said processing means relative to the other of said processing means.

2. An apparatus for processing dispersions of solids in a fatty phase, comprising:

at least one drive means for imparting rotational movement;

first processing means being formed as a processing container including at least one supply opening and at least one discharge opening, the processing container being of conical shape having an outer conical surface, an inner conical surface, and a smaller front plane of its conical shape located on a side of said supply opening, said supply opening and said discharge opening being located distant from each other on said first processing means;

second processing means substantially concentric to said first processing means and having an outer surface facing the inner conical surface of the processing container of the first processing means;

at least one of said first and second processing means being connected to a respective one of said at least one drive means, at least one of said first and second processing means including shearing tool means which protrude radially toward the other of said processing means, said first and said second processing means being supported in a rotatable manner relative to each other about an axis of rotation, a processing gap being formed therebetween; and journal means for enabling rotation of one of said first and said second processing means relative to the other of said first and said second processing means;

wherein the shearing tool means of one of said first and said second processing means, relative to the direction of rotation, have ointment-producing surfaces (30a) which diverge relative to a facing surface of the other of said first and said second processing means in a forward direction of movement of said one of said processing means relative to the other of said processing means;

wherein the angle of divergence ($\alpha 1$, $\alpha 2$) in the region of larger diameter of the processing container is smaller than in a region of smaller diameter of the processing container, wherein the angle of divergence is measured between an edge of a tool of the shearing tool means of said one of said first and said second processing means and the facing surface of the other of said first and said second processing means.

3. An apparatus for processing dispersions of solids in a fatty phase, comprising:

at least one drive means for imparting rotational movement;

first processing means being formed as a processing container including at least one supply opening and at least one discharge opening, the processing container being of conical shape having an outer conical surface, an inner conical surface, and a smaller front plane of its conical shape located on a side of said supply opening, said supply opening and said discharge opening being located distant from each other on said first processing means;

second processing means substantially concentric to said first processing means and having an outer surface;

at least one of said first and second processing means being connected to a respective one of said at least one drive means, at least one of said first and second processing means including shearing tool means which protrude radially toward the other of said processing means, said first and said second processing means being supported in a rotatable manner relative to each other about an axis of rotation, a processing gap being formed therebetween; and journal means for enabling rotation of one of said first and said second processing means relative to the other of said first and said second processing means;

wherein the shearing tool means, relative to the direction of rotation, have a radially outer shearing edge and are twisted in a helical manner; and an edge of a tool of said shearing tool means of one of said first and said second processing means diverges relative to an opposing surface of the other of said first and said second processing means.

4. Apparatus for processing dispersions of solids in a fatty phase, having at least two parts (1, 4) which can be driven with the aid of at least one drive and caused to rotate relative to one another, form a processing gap (6) between one another and are mounted relative to one another by means of at least one rotary bearing (2, 3), a first of which parts is in the form of container (1) which can be thermostated by a thermostating means (1', 13, 14, 15) and has at least one feed orifice (9) and at least one outflow orifice (11) for the formation of a flow of the dispersion towards a second of the parts, and the second part (4) is arranged essentially concentrically with the first part (1) and with the axis of rotation (A), and at least one of the two parts (1, 4) is provided with shearing tools (7, 8) on the respective surfaces (12, 16) of the first and the second parts facing one another, wherein the thermostating means (1', 13, 14, 15) is divided into at least two axially successive zones for different introduction or removal of heat in the axial direction, and edges of the shearing tools of one of said two parts diverge relative to the facing surface of the other of said two parts.

5. Apparatus for processing dispersions of solids in a fatty phase, having at least two parts (1, 4) which can be driven with the aid of at least one drive and caused to rotate relative to one another, form a processing gap (6) between them and are mounted relative to one another by means of at least one rotary bearing (2, 3), a first of which parts is in the form of a processing container (1) having at least one feed orifice (9) and at least one outflow orifice (11) for the formation of a flow of the dispersion towards a second of the parts and the second part (4) being arranged essentially concentrically with the first part (1) and with the axis of rotation (A), and at least one of the two parts (1, 4) being provided with shearing tools (7, 8) on the respective surfaces (12, 16) of the first and the second parts facing one another, wherein a further processing space (20; 120) having tools (21) of a refinement rotor (21, 23) which are arranged in said further processing space and can be driven and caused to make a relative rotation, project from a central shaft (23) radially towards the inner walls (19) bounding the further processing space (20) and extend at least in part along these inner walls (19) is connected to at least one of the stated orifices (9, 11), and edges of shearing tools of one of said two parts diverge relative to the facing surface of the other of said two parts.

6. Apparatus according to claim 5, wherein the refinement rotor (21, 23), as a conche treatment rotor, has shearing and/or ointment-producing tools (21).

7. Apparatus for processing dispersions of solids in a fatty phase, having at least two parts (1, 4) which can be driven with the aid of at least one drive and caused to rotate relative to one another, form a processing gap (6) between them and are mounted relative to one another by means of at least one rotary bearing (2, 3), a first of which parts is in the form of a processing container (1) having at least one feed orifice (9) and at least one outflow orifice (11) for the formation of a flow of the dispersion towards a second of the parts and the second part (4) being arranged essentially concentrically with the first part (1) and with the axis of rotation (A), and at least one of the two parts (1, 4) being provided with shearing tools (7, 8) on the respective surfaces (12, 16) of the first and the second parts facing one another, wherein a further processing space (20; 120) having tools (21) of a refinement rotor (21, 23) which are arranged in said further processing space and can be driven and caused to make a relative rotation, project from a central shaft (23) radially towards the inner walls (19) bounding the further processing space (20) and extend at least in part along these inner walls (19) is connected to at least one of the stated orifices (9, 11);

wherein the further processing space (20; 120) is arranged after the processing container (1) containing the shearing tools (7, 8), in the direction of material flow.

8. Apparatus for processing dispersions of solids in a fatty phase, having at least two parts (101) which can be driven with the aid of at least one drive and caused to rotate relative to one another, form a processing gap between one another and are mounted relative to one another by means of at least one rotary bearing (2, 3), a first of which parts is arranged as a conche trough space (20), and a second (21, 23) of which parts is arranged essentially concentrically with the first part (101) and with an axis of rotation (A) and has shearing and/or ointment-producing tools (21, 121) which project from a central shaft (23) radially towards an inner wall (19) bounding the conche space (20), wherein—relative to a predetermined direction of rotation of the shaft (23)—the tools include tools serving as scratching tools (8b; 121) having a shearing edge (29; 29a) inclined towards the inner wall (19) and ointment-producing tools (8a, 121) having ointment-producing surfaces (30; 30a) which diverge obliquely with respect to the inner wall (19) in the direction of rotation.

9. Apparatus according to claim 8, wherein a plurality of said tools are arranged in a circumferential ring about said central shaft, and wherein one tool (8b) of said tools having a shearing edge (29a) is provided in said ring of tools.

10. Apparatus according to claim 8, wherein the tools (121) having a shearing edge (29) and those (21) having ointment-producing surfaces (30) alternate with one another.

11. Apparatus according to claim 8, wherein the tools (121) having a shearing edge (29) and those (21) having ointment-producing surfaces (30) are arranged diametrically opposite one another.

12. Apparatus according to claim 8, wherein, the processing gap (g3) between the inner wall (19) and the shearing edge (29) of one of said scratching tools is smaller than the smallest processing gap (g4) between the inner wall (19) and an ointment-producing surface (30) of one of said ointment-producing tools.

13. An apparatus for processing dispersions of solids in a fatty phase, comprising:

at least one drive means for imparting rotational movement;

first processing means being formed as a processing container including at least one supply opening and at least one discharge opening, the processing container being of conical shape having an outer conical surface, an inner conical surface, and a smaller front plane of its conical shape located at one side of said supply opening, said supply opening and said discharge opening being located distant from each other on said first processing means;

second processing means substantially concentric to said first processing means and having an outer surface, said second processing means being in communication with said discharge opening of said first processing means to receive one of said dispersions after being discharged from said first processing means, outlet means of said second processing means being located distant from the discharge opening of said first processing means, thus enabling a continuous flow of dispersion from the supply opening of said first processing means to its discharge opening and said second processing means and from there to said outlet means;

at least one of said first and second processing means being connected to a respective one of said at least one drive means, at least one of said first and second processing means including shearing tool means which protrude radially towards the other of said processing means, said first and second processing means being supported in a rotatable manner relative to each other about an axis of rotation, a processing gap being formed therebetween; and wherein the shearing tool means, relative to the direction of rotation, have ointment-producing surfaces which diverge in the forward direction.

14. An apparatus for processing dispersions of solids in a fatty phase, comprising:

at least one drive means for imparting rotational movement;

first processing means being formed as a processing container including at least one supply opening and at least one discharge opening, the processing container being of conical shape having an outer conical surface, an inner conical surface, and a smaller front plane of its conical shape located at one side of said supply opening, said supply opening and said discharge opening being located distant from each other on said first processing means;

second processing means substantially concentric to said first processing means and having an outer surface, said second processing means being in communication with said discharge opening of said first processing means to receive one of said dispersions after being discharged from said first processing means, jacket means forming an intermediate space for selectively heating and cooling at least one of said first and second processing means and the dispersions in it;

vapor extracting means in communication at least with said second processing means for eliminating vapors possibly developing from one of said dispersions;

at least one of said first and second processing means being connected to a respective one of said at least one drive means, at least one of said first and second processing means including shearing tool means which protrude radially towards the other of said processing means, said first and second processing means being supported in a rotatable manner relative to each other about an axis of rotation, a processing gap being formed therebetween; and wherein the shearing tool means, relative to the direction of rotation, have ointment-producing surfaces which diverge in the forward direction.

\* \* \* \* \*